United States Patent Office 3,303,709
Patented Feb. 14, 1967

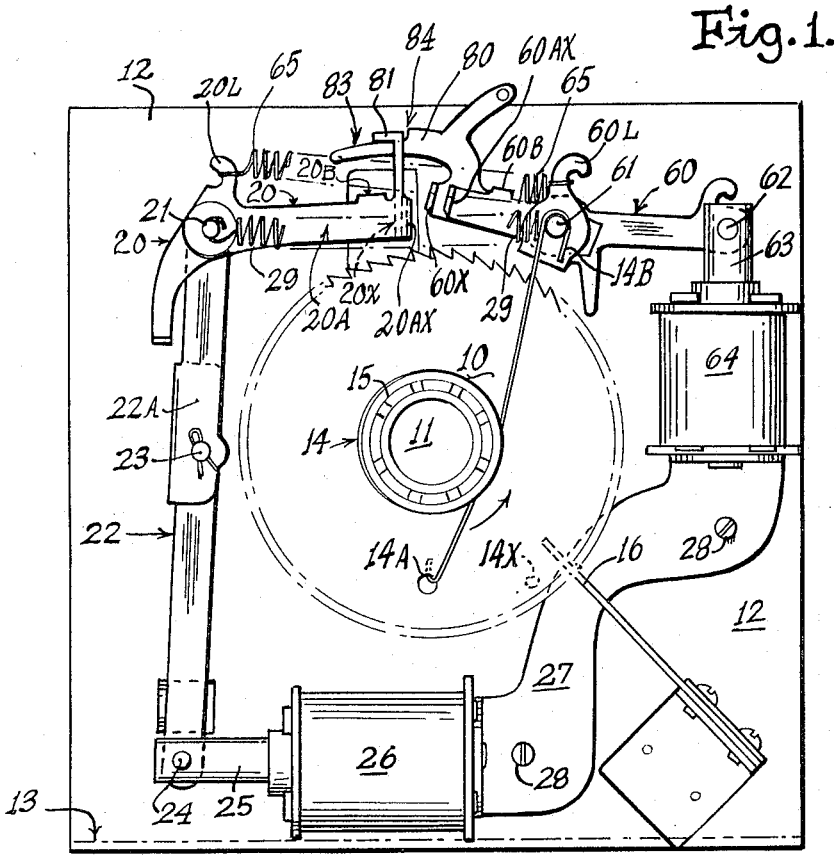
Fig.1.
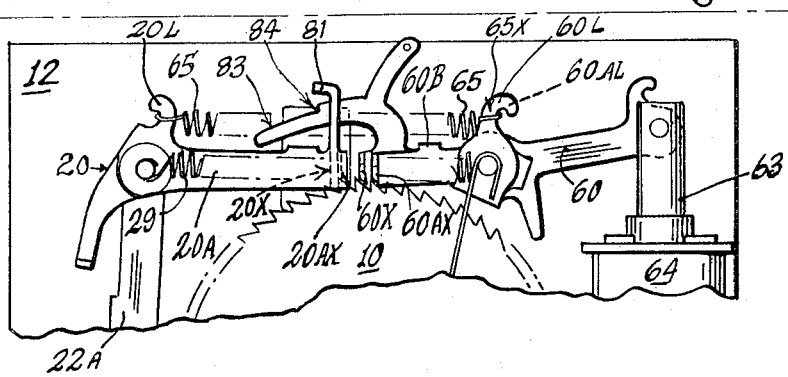
Fig.2.

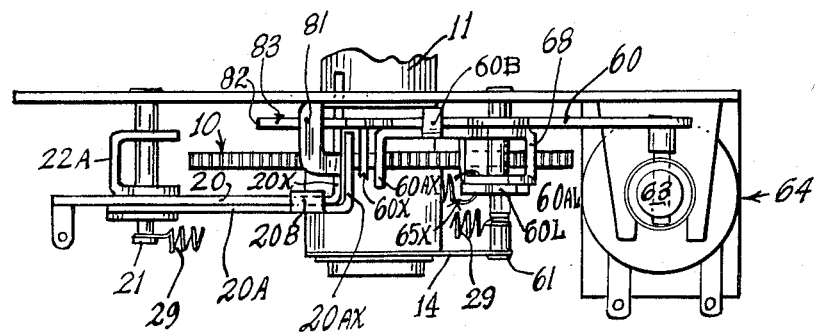
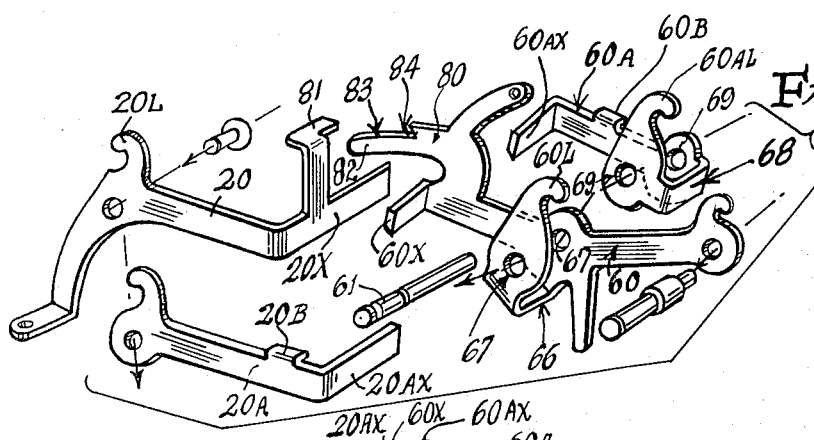
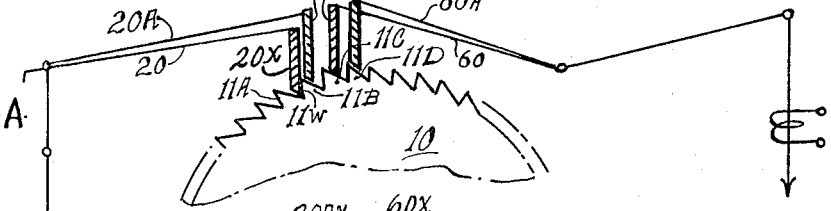
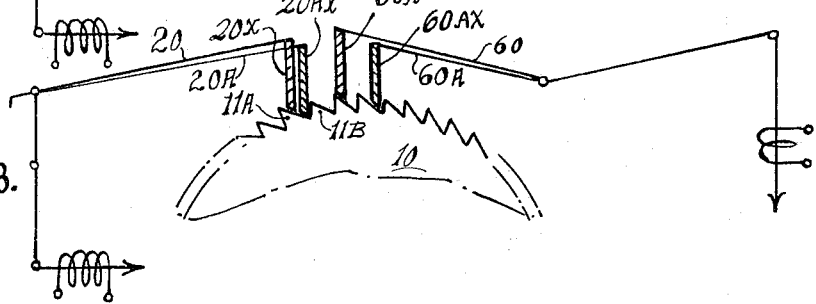
INVENTORS
ROGER T. SLISZ &
HERMAN L. SEIDEN
BY
ATTORNEY.

3,303,709
STEP-MULTIPLYING RATCHET WHEEL DRIVE
Roger T. Slisz, Schiller Park, and Herman L. Seiden, Chicago, Ill., assignors to Lion Manufacturing Corporation, Chicago, Ill., a corporation of Illinois
Filed May 18, 1964, Ser. No. 368,166
3 Claims. (Cl. 74—142)

This invention relates to improvements in ratchet-wheel stepping mechanisms for various types of totalizers, counters, score-indicating and analogous annunicator devices wherein a ratchet wheel is advanced step-by-step from a starting position as the result of operation of a driving pawl acting in the ratchet teeth of the wheel, the principal object of the invention being the provision of means for multiplying the stepping or counting range of such a device without changing the number of teeth on the wheel itself.

Commonly, such ratchet wheels are returned to the starting position by the action of a spring which is tensioned increasingly as the wheel advances from such positions, the gain of the wheel being held by an escapement type of holding dog which may be released at will to free the wheel for return by the spring. Where more than one revolution is taken to increase the stepping range, the spring tension may become objectionably great for a given driving mechanism.

The counting or stepping range of the usual ratchet wheel of this type accordingly tends to be limited to the total number of ratchet teeth provided in those devices in which the wheel is to be spring-returned to a starting position after making approximately one revolution, although there are arrangements employing special mechanism for extending the range beyond one revolution or continuing the movement of the wheel always unidirectionally, while resetting the counting or display drive shaft, such arrangements being of no particular relevance to the present disclosures, however, by reason of their involving more expensive or complicated or functionally different mechanisms of entirely different character from the means herein disclosed for multiplying the stepping count of a ratchet wheel of the type described without enlarging the diameter of the wheel or making the ratchet teeth so small that accurate stepping action becomes impossible at the faster speeds, this objective being achieved in principle by providing a novel stepping pawl and holding dog mechanism which is capable of operating in half steps with complete accuracy, so that the counting capacity or stepping range of a given wheel can be doubled without changing the wheel diameter or the number or size of the teeth or the driving stroke.

More detailed aspects of novelty and utility inherent in the invention will become apparent as the following description of an illustrative embodiment of the device proceeds in view of the annexed drawings, in which:

FIGURE 1 is an elevational view of the improved ratchet stepping mechanism;

FIGURE 2 is a fragmentary elevational detail similar to FIGURE 1 but showing the parts in a different condition of operation;

FIGURE 3 is a top plan view of the mechanism looking down upon the device in the direction of lines 3—3 of FIGURE 2;

FIGURE 4 is an exploded perspective view of the split-step pawl and dogging mechanisms;

FIGURES 5–A and 5–B are schematic operational diagrams.

The step-up unit depicted in FIGURE 1 is generally similar in appearance and many of its parts to the type of mechanism shown in U.S. Patents Nos. 2,281,22 and 2,895,340 and in a copending application Serial No. 337,346, now Patent 3,242,746, insofar as such devices all include a ratchet wheel 10 fixed on a spindle 11 which is journalled on a base plate 12 having an offset foot portion 13 serving as a mounting base.

The wheel-spindle 11 usually extends through the opposite face of the base plate (not shown) where it may engage with some form of rotary switch means, or an indicating dial or anything requiring a step-by-step angular advance.

A large coil spring 14 encircles the spindle and is retained thereon by a spider washer 15, one end portion 14A of this spring hooking into a hole in the wheel and the other end 14B being anchored on a stud shaft 61 fixed in the base plate, the effort of this spring being to turn the wheel counterclockwise back to a starting position determined by a stop lug 14X on the inner face of the wheel and engageable with a spring stop blade 16, it being evident in this embodiment that staid stop lug will also limit the travel of the wheel in the stepping direction to slightly less than one complete revolution.

Means for advancing the wheel comprises a stepping pawl 20 pivotally mounted at 21 on the upper end of an oscillable drive lever 22 rocking on a pin 23 staked into the base plate, said lever having a channel-shaped mid portion 22A affording spaced bearing holes for stable engagement with said pin.

The lower end of the drive lever is pivotally coupled at 24 with the plunger 25 of an electromagnetic solenoid 26 carried on a subassembly bracket 27 secured by screws 28 to the base plate.

Means for holding the gain of the wheel includes a holding dog lever structure 60 pivotally mounted on the pin 61 and having one end portion pivotally coupled as at 62 to the plunger 63 of a reset or release solenoid 64 also carried on the subassembly bracket 27.

The driving pawl 20 and the holding dog lever 60 are respectively rocked clockwise and counterclockwise down onto the teeth of the ratchet wheel by a common traction spring 65 having one of its ends hooked onto an offset lug 20L on the driving pawl and a similar lug 60L on the holding dog lever.

The ultimate driving effort of the drive lever 22 is supplied by another tractile spring 29 having one of its ends hooked onto the pivot pin at 21 and its opposite end hooked onto the dog pivot pin 61 so that the drive lever is normally urged toward the right and in the direction of advance of the ratchet teeth. Thus, when the driving solenoid 26 is energized, the drive lever at its upper end moves toward the left and retracts the driving pawl means so that the driving dog or pawl portion, later referred to in detail, will be retracted idly in the escapement direction over the teeth, and when the solenoid is deenergized the dog will drive into the teeth owing to the pull of the driving spring 29.

The construction of the holding dog means is such that when the release solenoid 64 is energized, not only is the holding dog elevated out of engagement with the teeth, but a special dog 80 engaging an offset arm 81 of the driving pawl lifts the latter with it free of the teeth so that the wheel is entirely free to turn back to its starting position under the urgence of the return spring 14, such a condition of release or rest being depicted in FIGURE 1, whereas the condition shown in FIGURE 2 is that of readiness for the usual advancing operations, should the stepping pawl be actuated, or a releasing operation should the holding dog be actuated.

The stepping pawl and holding dog components and operations thus far described are essentially the same as found in the aforesaid Patents Nos. 2,281,262 and 2,895,340 and exemplify the general type of ratchet mechanism with which the presently-disclosed step-multiplying means is especially useful, the basic functional aspects of such means being illustrated schematically in FIGURE 5-A wherein the principal stepping pawl 20 is seen to have a companion pawl 20A copivotally mounted therewith on the pin 21, this companion pawl having an offset tab 20B which overlies the main pawl lever 20 in such manner that when the latter is elevated from the ratchet teeth to free the wheel for resetting, the companion pawl is likewise lifted with it free of the teeth. Similarly, the principal holding dog 60 is provided with a companion holding dog 60A copivotally mounted therewith on the pin 61 and also having an offset tab 60B overlying the main dog so as to be lifted by and with the latter free of the teeth for the resetting operation.

The pawl or tooth-engaging part 20X of the main stepping pawl is shown in FIGURE 5-A to be lodged down in the root of the tooth 11A before the leading or working side 11W thereof (see also FIGURE 6), whereas the pawl portion 20AX of the secondary or companion stepping pawl is lodged substantially on the peak or crown of its tooth 11B, which may be the next adjacent or preceding tooth ahead of the tooth 11A, or may be one or more teeth away, as desired, the operation being such that when the stepping solenoid is next energized the driving stroke will be imparted in this illustration by the main pawl 20X, and at the conclusion of such an operation the two stepping pawls will reverse their positions relative to said teeth in the manner depicted in FIGURE 5-B, wherein it will be observed that now the auxiliary stepping pawl 20AX is down in the root before the leading or working side of the next preceeding tooth 11B, while the main pawl 20X is now lodged approximately upon or near the crown of the tooth 11A on the trailing or escapement side of this tooth. For a given size of ratchet tooth, the relative thicknesses of the two stepping pawls 20X and 20AX and their proximity, one with respect to the other, is such that these pawls will alternately reverse their positions of engagement with the teeth, one lodging in the root of the teeth while the other is lodged either upon the crown or somewhere along the trailing or escapement side of a tooth at a distance ahead of any working or driving side of any tooth such that it cannot drivingly engage such tooth until the next stroke.

In order to double the stepping range, these two driving dogs will thus have a working separation equivalent to one-half tooth in a situation such as shown in FIGURES 1 and 2 wherein, for reasons of commercial expedience, these two dogs were required to be as close together as possible. These driving dogs might, however, be placed at two and one-half or even five and one-half teeth apart if desired.

The operation of the two holding dogs is similarly alternated, it being observed in FIGURE 5-A that the dogging portion 60X of the principal holding dog is lodged closer to the root of the tooth 11C than is the other holding dog 60AX in respect to the tooth 11D, so that it will perform the next holding function when the driving dog starts to retract and the ratchet wheel attempts to move under urgence of the return spring, the holding dog 60AX being at this time lodged close to the crown of the tooth 11D.

The spacing between the two holding dogs should be equivalent to one and one-half teeth in the embodiment of FIGURES 1 and 2, mainly for convenience, such spacing being optionally either one-half tooth as a minimum for a double range ratchet, or one and one-half, two and one-half, etc. teeth, as desired, the important thing being that each dog or each pair, whether for driving or holding, must alternate in effective operation to perform its fractional part of the displacement to be achieved. Thus, three dogs each driving one-third step or tooth could triple the range, and the principle can be expanded to the point where the steps might become larger or the wheel diameter made larger. In the case of the illustrative embodiment, a standard size ratchet wheel 10 has its range doubled to 200 steps using the same teeth that previously yielded only 100 steps.

It will be observed from the schematic of FIGURES 5-A, 5-B that in neither case is the holding dog shown touching any teeth. The reason for this is that the operating tolerance and spring tensions are such that the driving pawls thrust firmly against the teeth (as in FIGURES 5-A, 5-B) while they are in the idle state and tend to hold the teeth slightly away from the holding dogs, but as soon as the drive lever is retracted in a driving operation, the ratchet wheel tends to move slightly until one of the holding dogs stops it, this movement being of no particular concern other than as a peculiarity of the actual manner of operation and explanation of the position of the dogs shown for purposes of illustration.

The actual construction and assembly of the dual pawl and dog means is seen in FIGURE 4, the primary or principal stepping pawl 20 having its tooth-engaging pawl portion 20X considerably elongated so as to underlie the nose portion 82 of the release and latch means which forms part of the principal holding dog, the operative relationship of these parts being seen in FIGURE 3. The automatic lock-up pawl 81 extends upwardly from the pawl portion 20X and also laterally in order to ride upon the arcuate upper edge 83 of the release dog in such manner as to drop down behind the locking notch 84 of the latter when it rises responsive to energization of the reset solenoid, in consequence of which the main stepping pawl and holding dog become interlocked at 84 and will remain in the elevated release condition shown in FIGURE 1 until the stepping solenoid is next energized to break this interlock, this automatic latch-up operation being only incidental to the operation of the illustrative type of step-up device chosen, and not being essential to operation of the split-step multiplying means disclosed.

The tooth-engaging pawl portion 20AX of the auxiliary stepping pawl, as seen in FIGURE 4, is similarly elongated to extend in parallelism with the like pawl portion 20X of the main stepping pawl in order that close tolerances need not be kept in assuring that such pawl portion will at all times adequately overlie the ratchet teeth, and also as a means for maintaining a certain minimal rigidity and alignment between the two pawl portions 20X and 20AX in respect to the spacing between themselves and the ratchet teeth which they are to engage, so that highly critical fabrication tolerances, again, need not otherwise be maintained at the pivotal mounting of these two pawls, which might otherwise require additional expense to provide the necessary rigidity to avoid loose play giving rise to inaccurate split-step action. Similar rigidity is desirable for the two holding dogs, but the mounting of the latter is effected differently, as will appear, so that the respective pawl portions of these dogs can be spaced apart as necessary.

As viewed in FIGURE 4, the principal holding dog 60 has an intermediate portion offset and formed to provide a U-shaped trunnion or yoke 66 in each arm of which are aligned bearing holes 67 in which the pivot pin 61 engages; and the auxiliary or secondary dog 60A has a similarly formed trunnion or yoke part 68 dimensioned to fit within the trunnion of the main dog and provided with aligned bearing holes 69 also engaging the pin 61, so that these two dogs are copivotally mounted each with two substantially spaced bearing points.

The aforesaid interfitting trunnion portions 66, 68 of the two holding dogs respectively have eccentrically-situated spring lugs 60L and 60AL each aligning with the other, as in FIGURE 3, and the end of the spring 65 is hooked over both lugs, FIGURES 1 and 3 as at 65X, while the opposite end of this spring likewise hooks over similarly aligned spring lugs 20L and 20AL on the copivotally-mounted stepping pawls, in consequence of which the dual sets of stepping pawls and holding dogs are jointly urged by the one spring 65 down into and onto the ratchet teeth, the spring action at these points of hooked attachment or anchorage being such as to permit one companion pawl or dog in each of said sets to lodge upon or near the crown of a tooth while the companion member lodges in the root region thereof.

The pawl portion 60X of the principal holding dog and the pawl portion 60AX of the auxiliary dog (FIGURE 4) are elongated laterally to afford adequate spanning and tolerance for alignment with the ratchet teeth, as in the case of the stepping pawls; and the auxiliary or secondary holding dog has an offset tab 60B overlying the edge of the main dog, as in FIGURE 3, so as to be raised free of the teeth by the main dog responsive to energization of the release or reset solenoid 64.

Thus, in the actual assembly relationship depicted in FIGURE 3, it will be observed that the two stepping pawls 20 and 20A and their respective pawl offsets 20X and 20AX may be mounted in substantially an interfitting side-by-side relationship on the same pivot; and the two holding dogs are similarly carried on the same pivot or spindle with their respective trunnion formations interfitted; and one spring 65 commonly engaging with all pawls and dogs serves to urge each of the same into operative engagement with the ratchet teeth with permitting individual movement of any of these members. Moreover, in each case a single or common actuating or driving means, such as the solenoids 26 and 64, respectively moves the two stepping pawls or the two holding dogs simultaneously, but owing to the particular arrangements disclosed, only one of the pawls of the set will drive the wheel during any given advancing stroke or operation, and the driving effort of each stepping pawl is only alternately effective with respect to the other responsive to successive actuations of its driving means.

Likewise, the two holding dogs are operatively urged by a common driving spring means in their respective holding functions, but perform their respective holding and escapement operations in alternation owing to their form and disposition in respect to the ratchet teeth, while a single actuating means in the form of the solenoid 64, for example, serves to move both holding dogs at the same time into the wheel-releasing elevated condition.

The automatic disabling interlock and automatic "first-step" releasing action which occurs at the mutually inter-engaging parts 80, 81 (FIGURE 1) to keep all dogs free of the wheel indefinitely until the next cycle of operation of the stepping pawl is initiated, is not essentially related to the split-step or multiplied stepping action or means disclosed herein, such interlock features being incidental to the particular type of step-up device illustrated as exemplary of one commercial form of such a device utilizing the novel split-step drive and holding features incorporated therein, it being understood that such novel step-multiplying means may be applied to a variety of step-up mechanism employing a ratchet member and stepping or holding pawls and dogs of fundamentally analogous character well known in the art.

We claim:

1. In a step-by-step ratchet wheel advancing mechanism, the combination with a thin ratchet wheel having a given number of teeth and spring means for urging the wheel to a normal starting position, of a step-multiplying driving pawl and holding-dog means comprising: a lever oscillable to reciprocate a driving pawl; a first driving pawl pivotally mounted on said lever to pivot in a plane parallel to the plane of rotation of the wheel and having a laterally-offset driving dog of an order of thinness comparable to the thinness of the wheel and engageable in the wheel teeth; a second driving pawl co-pivotally mounted in side-by-side relation with said first pawl and having a similarly laterally offset and thin driving dog disposed close behind the first dog in a relationship thereto and to the wheel teeth in a manner to engage a wheel tooth at a point along the tooth configuration which is relatively different from the point simultaneously engaged by the first dog and contrived such that first one and then the other of said dogs will engage with a tooth at said point to drive the same in alternation responsive to oscillation of said driving lever, said dogs having a length in the direction of offset several times the thickness of the wheel so that critical alignment of the pawls and dogs with the plane of wheel movement is obviated to permit use of a relatively thin and light ratchet wheel; together with releasable holding dog means cooperable with said wheel and acting to hold the gain imparted thereto by either driving dog.

2. Ratchet wheel mechanism according to claim 1 wherein said holding dog means comprises a pair of co-pivotally mounted holding pawls each having a thin holding dog laterally-offset in like manner to the offset of the driving dogs, and each said pawl is yieldingly urged to dispose its holding dog in holding engagement with relatively different wheel-tooth portions in the same relationship thereto and with respect to each other as that in which said driving dogs engage relatively different wheel tooth points whereby the holding dogs likewise act in alternation to hold the gain of the ratchet wheel in concert with the alternate driving action of the driving dogs.

3. Mechanism according to claim 2 wherein said holding dog means includes means cooperable with at least one driving dog and acting to move the same free of the wheel teeth for retrograde motion responsive to release movement of at least one of the holding dogs to free the wheel for such retrograde motion, and means for intercoupling the driving dogs and for intercoupling the holding dogs such that when the one driving dog is moved free of the wheel as aforesaid and the one holding dog is releasably moved as aforesaid, all dogs are moved free of the wheel to permit such retrograde motion.

References Cited by the Examiner

UNITED STATES PATENTS

| | | | |
|---|---|---|---|
| 1,025,088 | 4/1912 | Hess | 74—154 |
| 2,119,111 | 5/1938 | Minkowitz | 74—577 |
| 2,281,262 | 4/1942 | Breitenstein | 74—142 |
| 2,410,708 | 11/1946 | Breither | 74—142 |
| 2,452,030 | 10/1948 | Hughes | 74—142 |
| 2,606,639 | 8/1952 | Dolman | 74—142 X |
| 2,609,698 | 9/1952 | Patzer | 74—142 X |
| 2,638,789 | 5/1953 | Binks | 74—142 X |
| 2,864,260 | 12/1958 | Nicolaus | 74—142 |
| 2,895,340 | 7/1959 | Nicolaus | 74—142 |
| 3,010,055 | 11/1961 | Nicolaus | 74—142 X |

FRED C. MATTERN, JR., *Primary Examiner.*

BROUGHTON G. DURHAM, *Examiner.*

D. P. ROONEY, *Assistant Examiner.*